March 29, 1966  M. H. F. GIOT ETAL  3,243,583
MULTIPLICATION CHECKING APPARATUS
Filed Feb. 23, 1962  4 Sheets-Sheet 1

INVENTORS
MAURICE HENRI FERNAND GIOT
BERNARD JOBART
CHARLES ROGER FEVROT
JEAN MEYER
BY
ATTORNEYS

March 29, 1966  M. H. F. GIOT ETAL  3,243,583
MULTIPLICATION CHECKING APPARATUS
Filed Feb. 23, 1962  4 Sheets-Sheet 2

INVENTORS
MAURICE HENRI FERNAND GIOT
BERNARD JOBART
CHARLES ROGER FEVROT
JEAN MEYER
BY
ATTORNEYS

March 29, 1966    M. H. F. GIOT ETAL    3,243,583
MULTIPLICATION CHECKING APPARATUS
Filed Feb. 23, 1962    4 Sheets-Sheet 3

INVENTORS
MAURICE HENRI FERNAND GIOT
BERNARD JOBART
CHARLES ROGER FEVROT
JEAN MEYER
BY
ATTORNEYS

INVENTORS
MAURICE HENRI FERNAND GIOT
BERNARD JOBART
CHARLES ROGER FEVROT
JEAN MEYER

BY

ATTORNEYS

United States Patent Office 3,243,583
Patented Mar. 29, 1966

3,243,583
MULTIPLICATION CHECKING APPARATUS
Maurice Henri Fernand Giot, Bernard Jobart, and Charles Roger Fevrot, Paris, and Jean Meyer, Neuilly-sur-Seine, France, assignors to S.A.T.A.M.—Societe Anonyme pour Tous Appareillages Mecaniques and Sud-Aviation Societe Nationale de Constructions Aeronautiques, both of Paris, France, both French companies
Filed Feb. 23, 1962, Ser. No. 175,182
Claims priority, application France, Feb. 22, 1961, 853,502
10 Claims. (Cl. 235—153)

The present invention relates to calculating machines and more particularly to a system of control and interconnection for multiplying apparatus intended to effect multiplication of a given multiplier by a variable multiplicand, for example as employed in dispensing systems for determining the sales price of a variable quantity of a product wherein the multiplier is the price per unit quantity and the multiplicand is the number of units of the product involved in the sale.

The invention finds application, for example, in systems for the dispensing of liquid fuels. Dispensing apparatus of this type includes a volume measuring device from whose operation there is derived an indication of the volume of fuel delivered and also of the price to be paid therefor, this price being automatically computed as a function of a unit price or price per unit volume. The unit price may be displayed by the apparatus pursuant to governmental authority or requirement.

Dispensing apparatus of this kind exists in many forms, the computing elements thereof being either electrically or mechanically operated. According to the construction of such apparatus, there may or may not exist a connection or coupling between the unit price as displayed in accordance with the requirements of law and the computing device from which the sales price is derived. In the latter event there exists the possibility of fraudulent error, the unit price displayed being different from the one introduced into the computer.

Moreover, and whatever the particular form of construction thereof, automatic dispensing devices are subject to malfunctions which may falsify the computation of sales price in such a manner that the error is not apparent.

Although the description of the invention thus far has been in terms of its application to fuel distributing systems, it is to be understood that the invention is applicable to all other dispensing systems in which there exists a similar requirement for control of a multiplication operation. For example, such a problem exists in a cable unreeling device where a computer is intended to indicate continuously the aggregate resistance of the cable which has been unreeled, by multiplying as a multiplicand the length of cable unreeled by the resistance per unit length, constituting a multiplier.

Broadly, in apparatus according to the invention, each time the quantity delivered passes through a repetitive reference level there is effected a check for the existence of exact coincidence between the applicable multiplier and multiplicand quantities, these quantities being displayed in any desired manner, and the product, likewise displayed. Thus in the case of fuel dispensing apparatus there is provided means for checking the exact coincidence, for a given volume of fuel dispensed, between the product of this volume multiplied by the unit price per volume on the one hand and the amount indicated as payable on the other hand.

Apparatus according to the invention comprises an electrical or electronic coincidence circuit including one or more electronic or other equivalent gates having a single output connected to a suitable signalling device. The coincidence circuit is so arranged that the gate or gates permit passage therethrough of a pulse representative of the multiplicand only when the multiplicand and the product separately and simultaneously reach values which are specified as a function of the multiplier.

In particular, in the case of application of the invention to an automatic fluid dispensing system, the coincidence circuit manifests coincidence only when the volume counter and the price counter separately and simultaneously register values which are computed as a function of the unit volume price.

For the sales price this value may advantageously be equal to the unit volume price or price per unit volume multiplied by a specified power of ten, and for the volume value it may take the form of the unit of volume multiplied by a specified power of ten. In such case the coincidence circuit may possess a simplified form in consequence of the fact that the digits which make up the number representative of the price to be paid are the same as those of the unit price.

The invention will now be further described in terms of a preferred non-limitative example with reference to the accompanying drawings which illustrate application of the invention to a liquid fuel dispensing system in which the computer is of electric nature operating on pulses representative of volumes delivered and on pulses representative of the price. In the annexed drawings FIG. 1 is a diagram of a coincidence circuit for a delivery system in which the unit price includes only one significant figure;

Figure 1:
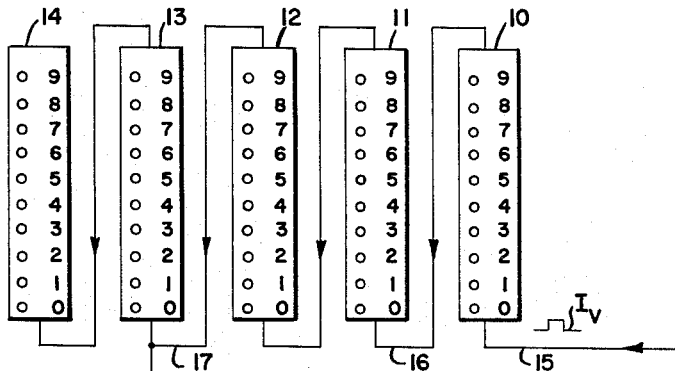

FIG. 1 shows a coincidence circuit for a liquid dispensing system in which the price per unit volume of the liquid to be dispensed includes only one significant figure and which is arranged to indicate coincidence with respect to a delivery of ten unit volumes and with respect to a sales price to be paid of ten times the unit price. For example, if the unit of volume is the liter and if the unit price is 0.4 franc per liter, the apparatus of FIG. 1 is arranged to detect coincidence between the liquid metering device and the sales price computer when the quantity of liquid dispensed is 10 liters and when the price to be paid is 4 francs.

Figure 6:
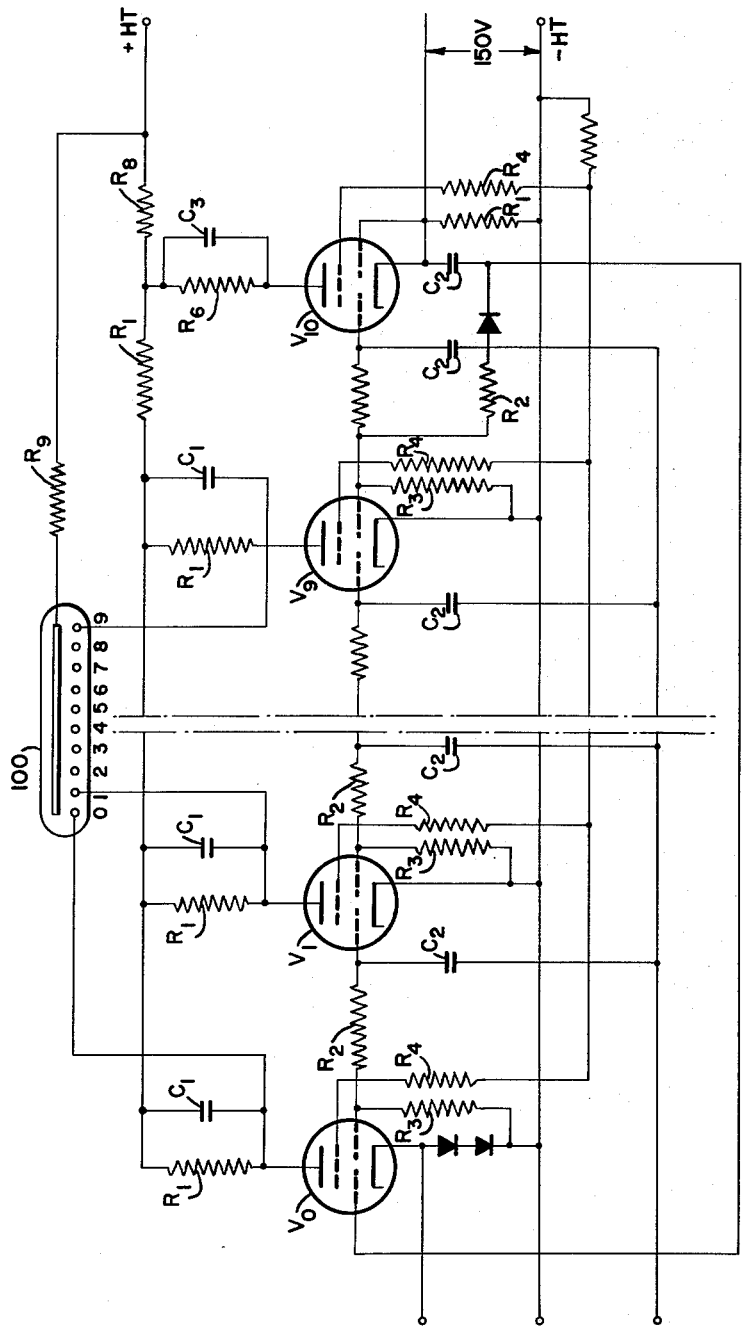
FIG. 6 is a diagram of a ring counter which may be employed in the apparatus of the invention.

FIG. 1 shows schematically a coincidence circuit in which the totalization and display of the volume dispensed, and similarly the totalization of the price to be paid, are effected by means of ring counters having a count of ten. Ring counters of this type are well known, and one suitable form is illustrated in FIG. 6.

Figure 2:
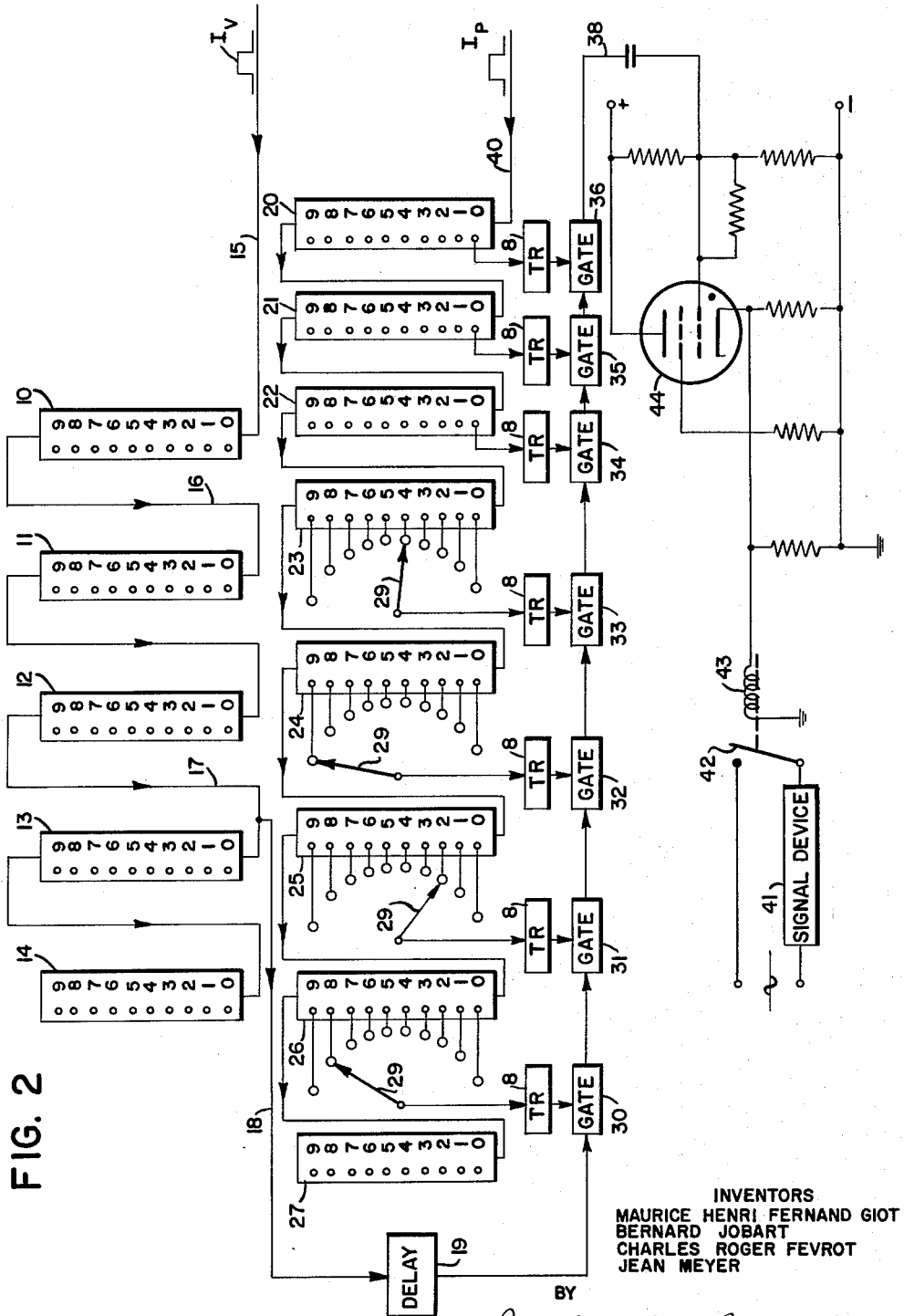
FIG. 2 is a diagram of a coincidence circuit for a delivery system in which the unit price includes four significant figures.
Figure 4:
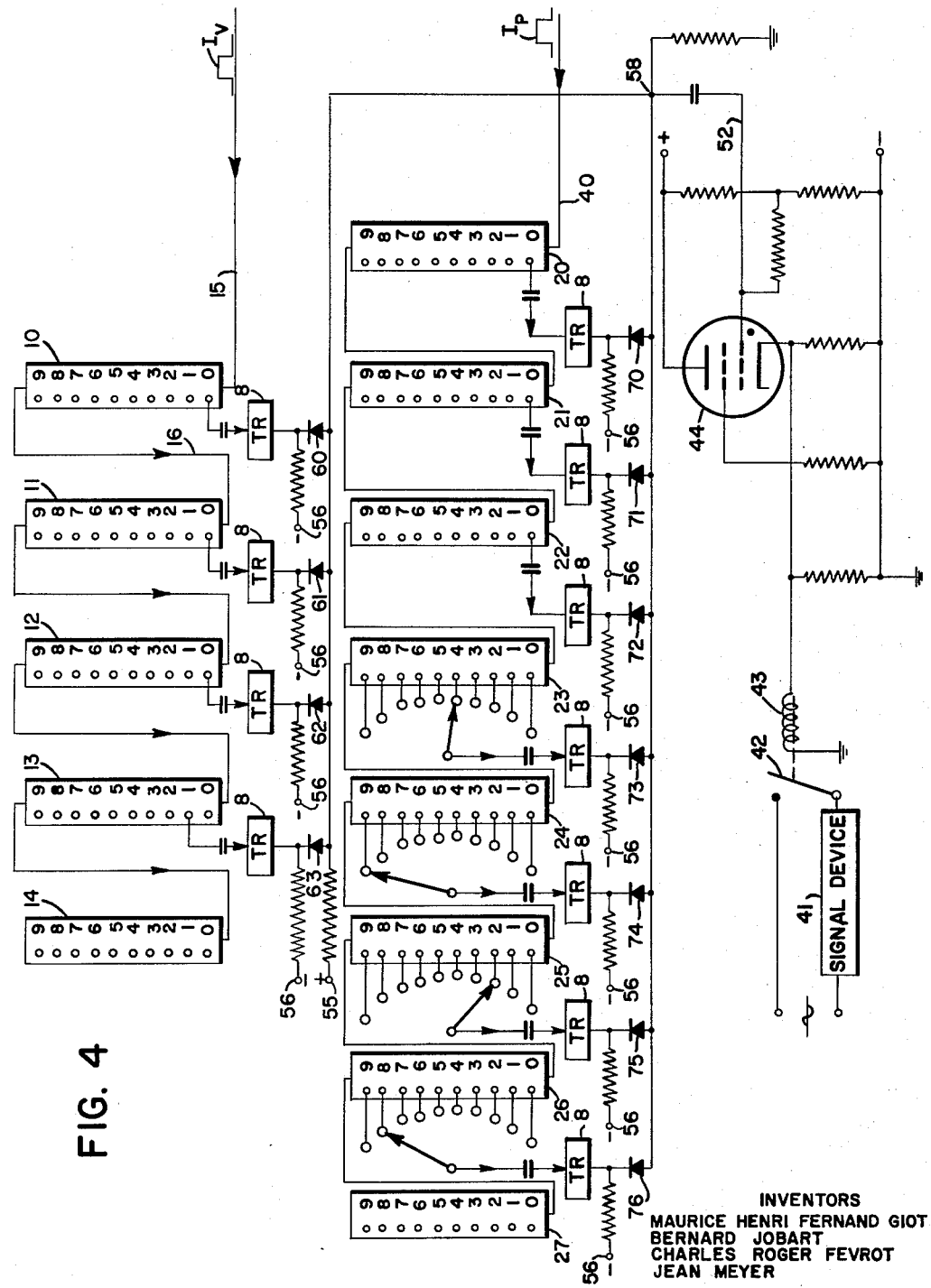
FIG. 4 is a circuit diagram of an alternative form of coincidence circuit.

Referring to FIG. 1, the liquid dispensing system comprises a volume totalizator including the decade counters 10, 11, 12, 13 and 14. Each of these decade counters or counting stages may comprise apparatus as shown in FIG. 6. The counting stages 10 to 14 are arranged to count respectively hundredths of liters, tenths of liters, liters, tens of liters and hundreds of liters. Each of the decade counters or counting stages 10 to 14 and also each of the similar counting stages 20 to 24 in FIG. 1, and likewise each of the counting stages 10 to 14 and 20 to 27 of FIGS. 2 and 4, is arranged to count ten digits, from 0 to 9. In each stage, a carry pulse is developed when that stage is stepped from 9 to 0, and this carry pulse serves as a stepping pulse in the stage of next higher order. In FIGS. 1, 2 and 4 each stage is diagrammatically represented in the form of a rectangle with circular windows numbered 0 to 9. These windows may serve to display the glow on the correspondingly numbered cathodes respectively of a ten-cathode-stepping tube such as that identified at reference character 100 in FIG. 6. The glow is shifted from cathode to cathode in tube 100 by conduction successively in ten grid-controlled gas discharge tubes $V_0$ to $V_9$, an eleventh such tube $V_{10}$ being provided for the transmission of carry pulses to the counting stage of the next higher order, where such carry pulses serve to step conduction successively to the tubes $V_0$ to $V_9$ of such next higher order. The count in any stage may be signalized not only by recognition of the location of the glow in the tube 100, but also by the change in voltage at an appropriate electrode in the conducting one of tubes $V_0$ to $V_9$. The anode is such a suitable electrode.

From a liquid flow metering device not shown, volume-representative pulses $I_v$ are delivered, one for each one hundredth of a liter passing through that device, to the counting stage 10 via a conductor 15. Assuming that initially the counting stage 10 is at zero count, when a pulse $I_v$ arrives via the conductor 15 it shifts the stage 10 from a count of zero to a count of one. The next volume pulse shifts the stage 10 from count 1 to count 2, and so on. When stage 10 reads 9 and when thereafter a tenth volume pulse arrives at conductor 15, stage 10 is restored to 0 count and the cycle of stage 10 begins again. In addition however the tenth pulse $I_v$ is transmitted as a carry pulse over line 16 to the next counting stage 11, shifting stage 11 from 0 to 1.

When ten more volume pulses have been delivered to stage 10 the tenth pulse of the second cycle of ten $I_v$ pulses passes via conductor 16 to stage 11, shifting the latter to position 2.

The price totalizator is arranged and made up in similar fashion, comprising decimal stages 20 to 24. Price pulses arrive via a conductor 40 to shift the counting stage 20 from position to position over its ten positions numbered 0 to 9. At the end of every cycle for the stage 20 a pulse is passed to the second stage 21, and similarly as between the higher order counting stages of the price and volume counters.

In the example being described with reference to FIG. 1, the unit price, i.e. the price per unit volume, includes only one significant figure, assumed arbitrarily for the sake of concreteness to be the digit 4.

In accordance with the customary requirements of the public authorities charged with weights and measures, this unit price digit is displayed in an appropriate manner. The means which control the price digit so displayed are coupled to a switch 29. The switch 29 of FIG. 1 has one movable contact and ten stationary contacts, each of the latter being coupled to a separate signal output electrode of the counting stage 23 such as the ten anodes of tubes $V_0$ to $V_9$ (FIG. 6) of that stage. Thus when the unit price is 4, switch 29 connects to the fourth tube $V_4$ of the stage 23. This tube corresponds to a price to be paid equal to ten times the unit volume price. That is, assuming a unit volume of one liter, arrival of conduction at the tube $V_4$ of stage 23 signifies an accumulated selling price equal to that of ten liters.

The coincidence circuit of FIG. 1 includes a conductor 18 which is connected to the carry conductor 17 passing between the liter stage 12 and the tens of liters stage 13 of the volume counter comprising counting stages 10 to 14. Consequently at the end of each cycle of the liter counting stage 12, a volume pulse $I_v$ is passed not only to the tens of liters stage 13 but also to the conductor 18.

In similar fashion the switch 29 is connected to a conductor 28 so that each time the fourth tube $V_4$ of the price counting stage 23 is energized, a price pulse $I_p$ passes onto the conductor 28.

The two conductors 18 and 28 both lead to an electronic gate 30.

Figure 5:
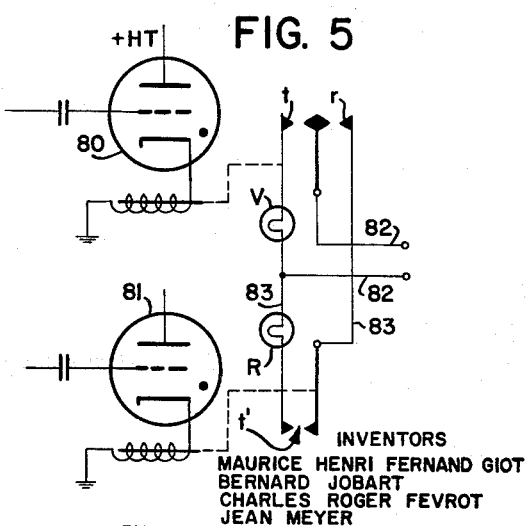
FIG. 5 shows a modified form of coincidence signalling device.

The term "electronic gate" is used to denote a device of known type having a plurality of inputs and a single output so arranged that the device permits signals to appear at its output only when it has received signals on all of its inputs. In the example illustrated, the gate 30 is so constructed that the signal arriving on conductor 18 can pass through the gate to conductor 38 only when the gate has been opened, for a specified time interval, by a signal from conductor 28. The conductor 38 is connected to a signalling device 50 of visual, audible or other suitable type. For example, the conductor 38 may control the energization of the pump which supplies liquid to the liquid dispensing apparatus. An example of a suitable signalling device is shown in FIG. 5.

The operation of the system illustrated in FIG. 1 is as follows:

Each time that tube $V_4$ of stage 23 receives a signal $I_p$, i.e. each time that tube is brought into conduction, that signal is transmitted via switch 29 and conductor 28 to the gate 30 and opens the gate for a specified time interval to signals on conductor 18. Each time counter 12 shifts from 9 to 0, the volume pulse $I_v$ effecting such shift is transmitted via conductor 18 to the gate 30. The pulse $I_v$ on conductor 18 can pass through the gate 30 to conductor 38 only if the gate 30 is open. If this pulse is able so to pass, it follows that there exists coincidence between the volume of ten liters delivered, as indicated by the state of counter 10–14, and the increment of four francs in total sales price to be paid as indicated by the state of counter 20–23. Consequently the price computation with respect to these ten liters is correct.

The gate 30 remains open for a time which is made to be a function of the accuracy with which the computation of sales price is to be verified or controlled. If for example this accuracy is to be that of one one hundredth of a liter, the open time of gate 30 is made to be the time required to deliver one one hundredth of a liter, i.e. the time interval between the arrival of two successive volume pulses $I_v$ on conductor 15. The gate 30 is closed after application of a pulse thereto from conductor 28 by suitable means such as an auxiliary timing relay 8 having a single input and which is open to an arriving signal voltage but which closes, in response to that signal voltage, within a specified time after arrival of that signal voltage. Thus the auxiliary timing relay 8 controls the duration of the opening of gate 30 in response to the signal on conductor 28, the timing relay 8 being adjusted so as to effect closure of the gate 30 before the arrival of the next price or volume pulse. A subsequent verification of the price computation can then be made only after resetting to zero of all stages of counter 20–23 and a new delivery equal to or greater than ten liters.

It may be, for reasons pertaining to the electronic circuit, that the price signal $I_p$ will appear at the stage 23 (i.e. to cause conduction at the one of tubes $V_0$ to $V_9$ thereof selected by switch 29) with a non-negligible delay by reference to the corresponding volume pulse $I_v$. In that case it will be sufficient to dispose in the conductor 18 a delay device as indicated at 19, delaying the ten liter volume signal from counter 10–14 as required so that that signal may arrive at the gate 30 coincidentally with the opening of that gate by the signal on conductor 28.

The switch 29 being controlled by the unit price display mechanism, correspondence is assured between the unit price displayed and the computed total sales price.

The embodiment of the invention illustrated in FIG. 1 is of a highly simplified nature in view of the fact that coincidence is sought only when the stage 23 reaches at position 4 independently of the condition of stages 22, 21 and 20.

FIG. 2 illustrates an embodiment of the invention similar to that of FIG. 1 wherein however the verification is carried out to the third decimal place and wherein moreover the price per unit volume includes four significant figures. In the example of FIG. 2 let the unit volume be assumed to be the liter and let the unit price be assumed to be 829.4 francs. Coincidence will then be exhibited for an aggregate sales price of 8,294.00 francs upon a sale of 10.0 liters.

Referring to FIG. 2, the delivery system comprises a volume counter identical to that of FIG. 1 including counting stages 10 to 14. It also includes a price totalizator similar to that of FIG. 1. The price totalizator comprises decade counting stages 20 through 27. The four significant figures 8, 2, 9 and 4 of the unit price are set up on four switches 29 in such a fashion that for coincidence testing at multiples of a volume of ten liters these switches are connected respectively to the eighth tube $V_8$ of stage 26, to the second tube $V_2$ of stage 25, to the ninth tube $V_9$ of stage 24 and to the fourth tube $V_4$ of stage 23. Tube $V_8$ of stage 26 connects via its switch 29 with a conductor 28 leading to one input to a gate 30. In the stage 25 tube $V_2$ connects via its switch 29 and a similar conductor 28 to a gate 31. Similarly tubes $V_9$ in stage 24 and $V_4$ in stage 23 connect respectively to inputs to gates 32 and 33. The tubes $V_0$ of stages 22, 21 and 20 are connected to inputs of additional gates 34, 35 and 36. Gates 31 to 36 may be similar or identical to gate 30.

The operation of the device of FIG. 2 is essentially similar to that of FIG. 1. When a volume pulse $I_v$ causes shift of counter 12 from 9 to 0, and consequently upon any shift of the count in stage 13 corresponding to an increment of ten liters in the quantity delivered, this pulse passes on via conductor 18 to the first gate circuit 30. In order for this pulse to emerge from the chain of gates 30–36 on output conductor 38, all of the gates 30–36 must have been opened and this requires the stages 26, 25, 24, 23, 22, 21 and 20 to be respectively at their eighth, second, ninth, fourth, zeroth, zeroth and zeroth positions, i.e. to exhibit conduction at their tubes $V_8$, $V_2$, $V_9$, $V_4$, $V_0$, $V_0$ and $V_0$ respectively (FIG. 6).

A delay device 19 may be inserted in conductor 18 as in the embodiment of FIG. 1.

It is moreover possible that the price pulses $I_p$ operative to open the gates 30 to 36 fail to arrive there simultaneously due to delays within the price counter stages. This can be taken care of by providing unlike open times to the various gates. Preferably however the connection of the gates and their mode of operation is changed in the following fashion:

The volume pulse $I_v$ arriving on conductor 18 is caused to open gate 30 and thus make possible passage of the impulse $I_p$ from tube $V_8$ of stage 26 through gate 30. The pulse so passing is then caused to open gate 31. This will permit passage of the price pulse from tube $V_2$ of stage 25 through gate 31 to gate 32. The price pulse from stage 25 in turn opens gate 32, permitting passage therethrough of the price pulse from tube $V_9$ of stage 24, and so on. The gates 30 to 36 are thus opened one after another, and the price pulse from the tube $V_0$ of stage 20 passes through gate 36 and emerges on conductor 38 to the signalling device which may take the form of an audible signalling device 41, controlled by a switch 42 responsive to a solenoid 43. The solenoid 43 is controlled by a thyratron 44 triggered by the pulse on conductor 38.

FIG. 4 shows a modification of the coincidence circuit according to the invention.

Figure 3:
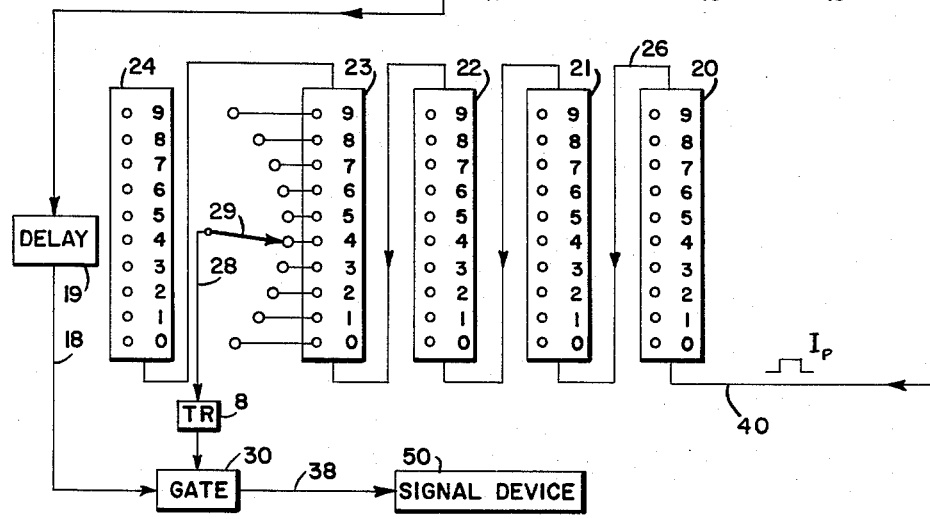
FIG. 3 is a circuit diagram of an electronic gate suitable for use in the invention.
Figure 3:
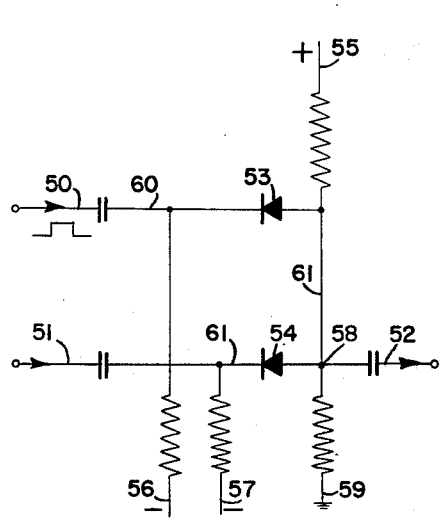

Electronic gates as shown in FIG. 3 are known per se. Such gates comprise separate inputs 50 and 51 and a single output 52. The input 50 includes a diode 53 and the input 51 includes a diode 54. These diodes are inserted into conductors 60 and 61 having a common positive terminal 55 and separate negative terminals 56 and 57. In the absence of a signal at points 50 and 51, current flows in the diodes 53 and 54, the potential at 58 being near ground 59. When a pluse of sufficient amplitude arrives at the terminal 50, the diode 53 is rendered non-conductive during the duration of the pulse but the potential at 58 does not change since the diode 54 continues to conduct, the current no longer passing through conductor 60 being now accommodated through conductor 61. The result is the same when a positive pulse is applied at terminal 51 but not at 50. In this latter case the current flows through the conductor 60.

In contrast when there is coincidence of pulses at 50 and 52, the two diodes 53 and 54 are both rendered non-conductive and the potential at 58 suddenly rises. This produces a positive output pulse at 52. Obviously the circuit of FIG. 3 can be extended by the addition of further inputs similar to the input 50, 53, 56, 60 or the input 51, 54, 57, 61.

Referring to FIG. 4, it will be seen that diodes 60 to 63 and 70 to 76 are arranged in the same way as the diodes 53 and 54 of FIG. 3 between a common positive terminal 55 and individual negative terminals 56. The array of diodes 60–63 and 70–76 shown in FIG. 4 constitutes an electronic gate having a single output 52. The voltage at point 58 rises suddenly only when all diodes are simultaneously rendered non-conducting. This occurs only when they all receive simultaneously blocking pulses, and this happens only when the stages 10, 11, 12 and 13 record a delivered volume of 10.0 liters and when the stages 20 to 26 record an aggregate price to be paid of 8,294.00 francs.

As in the apparatus of FIG. 2, the signal on conductor 52 activates a signalling device.

This signalling device may take any appropriate form. It may, for example, comprise a green light which is lighted and which remains lighted throughout the delivery so long as coincidence is maintained and a red light which is illuminated when coincidence is lost. Alternatively of course the signalling device, whatever its nature, may be arranged to interrupt the delivery of the liquid upon loss of coincidence.

Referring to FIG. 5, an arrangement of the former type comprises a first thyratron or grid-controlled gas discharge tube 80 whose control grid receives the signal from the output conductor 38 of FIG. 1 or FIG. 2 or from the conductor 52 of FIG. 4. This is the ten-liter coincidence signal. The circuit of FIG. 5 includes a second thyratron 81 which may receive an input signal for each liter delivered, independently of coincidence. With the thyratron 80 there is associated a two-position switch normally open at $t$ and normally closed at $r$. The switch when closed at $t$ completes a circuit 82 for illumination of a green lamp V whereas when closed at $r$ it completes an alternative circuit for illumination of a red signal R. Associated with the second thyratron 81 is a single pair of normally open switch contacts $t'$ introduced into the circuit 83. If the delivery system operates correctly, the relay controlled by thyratron 80 is energized upon the delivery of 10 liters, circuit 82 being completed thereby. If delivery is interrupted at 11 liters, thyratron 81 closes its associated switch contacts. However, the lamp V being lighted, the circuit 83 is opened at the normally closed contacts $r$ of thyratron 80 and the lamp R will not be lighted.

If on the contrary the operation of the system is incorrect, thyratron 80 receives no signal upon delivery of 10 liters and the lamp V will not be lighted. Moreover upon arrival a tube 81 of the signal for the delivery of 11 liters, tube 81 will complete the circuit 83, already closed at the normally closed contacts $r$ of thyratron 80 and the lamp R will be lighted.

The arrangements shown in FIGS. 1, 2 and 4 are based upon the assumption that the digits which make up the sum to be paid for each 10 liter multiple are those which make up the unit price. This represents merely a simplification which avoids the additional introduction of new contacts permitting simply the provision of a switching element for each digit of the unit price setting mechanism.

One may provide within the scope of the present invention an automatic control device similar to those hereinabove described, operating however upon delivery of any arbitrarily selected amount—five liters for example instead of ten liters. It will then be sufficient to insert additional contacts which are set to the price corresponding to five liters or else to derive this price from the contacts already provided by means of appropriate conductors.

The apparatus which has been described concerns liquid distribution systems in which the means for computing the volume of liquid dispensed and the total price to be paid are electronic in nature. The invention may however find embodiment in other forms of multiplying apparatus to verify the correctness of multiplication executed by that device independently of the multiplier itself. To this end it is sufficient to provide on the elements of such apparatus corresponding to stages 10 to 13 and 20 to 27 in the embodiments of FIGS. 2 and 4 terminals which can be connected to switches such as switches 29 leading to conductors such as conductors 18 and 28.

The invention although described hereinabove with respect to liquid fuel dispensing systems is applicable to other dispensing systems in which it is necessary to verify the multiplication of a unit price by a plurality of units dispensed.

We claim:

1. Apparatus for checking the correctness of a multiplication device for the multiplication together of a multiplier and a variable multiplicand, said apparatus comprising a coincidence circuit having at least one gate, said gate having plural inputs and having an output adapted to be connected to a signalling device, first means to apply to one of said inputs signals representative of the multiplicand, and second means to apply to another of said inputs signals representative of the product, at least one of said first and second means including means to limit the time duration of a signal applied by that one of said first and second means to the associated one of said inputs.

2. Apparatus for checking the correctness of a multiplication device for the multiplication together of a multiplier and a variable multiplicand, said apparatus comprising a coincidence circuit having at least one gate, said gate having plural inputs and having an output adapted to be connected to a signalling device, first means to apply to one of said inputs a signal upon attainment by the multiplicand of a selected magnitude, and second means to apply to another of said inputs a product-respresentative signal upon attainment by the product in said device of a value equal to the product of said selected magnitude multiplied by said multiplier, at least one of said first and second means including means to limit the time duration of a signal applied by that one of said first and second means to the associated one of said inputs.

3. Apparatus for checking the correctness of a multiplication device for the multiplication together of a variable multiplier and a variable multiplicand, wherein multiplicand pulses are generated representative of increments of a variable quantity and product pulses are generated at a rate proportional, according to the values of said multiplier, to the rate of generation of said multiplicand pulses, said apparatus comprising a multiplicand pulse counter, a product pulse counter, switch means settable according to the value of said multiplier to extract from said product pulse counter a signal upon attainment of a product pulse count corresponding for the value of said multiplier to the product pertaining to a selected magnitude of said variable quantity, means to extract from said multiplicand counter a signal upon attainment thereby of a count representative of said selected magnitude of said variable quantity, a coincidence gate circuit having at least two inputs and one output, and separate means to apply said signals to separate ones of said inputs, at least one of said last-named means passing a signal applied thereto for a limited time only.

4. Apparatus for checking the correctness of a multiplication device for the multiplication together of a variable price-representative multiplier and a variable quantity-representative multiplicand, wherein quantity pulses are generated representative as a multiplicand of increments of a substance delivered and sales price pulses are generated representative of increments of sales price at a rate relative to the rate of generation of said quantity pulses controlled by a unit price multiplier setting means, said apparatus comprising a quantity pulse counter, a price pulse counter, switch means connected with said price pulse counter settable according to the position of said setting means to extract from said price pulse counter a signal upon attainment of a price pulse count corresponding, for a selected setting of said setting means, to the aggregate sales price of a selected quantity, means to extract from said quantity pulse counter a signal upon attainment by said quantity pulse counter of a count representative of said selected quantity, a coincidence gate circuit having plural inputs and a single output, and separate means to apply said signals to separate ones of said inputs, at least one of said last-named means passing a signal applied thereto for a limited time only.

5. Apparatus for checking the correctness of a multiplication device for the multiplication together of a variable multiplier and a variable multiplicand, wherein multiplicand pulses are generated representative of increments of a variable quantity and product pulses are generated at a rate relative to the rate of generation of said multiplicand pulses representative of a selected value for said multiplier, said rate of generation of product pulses being expressible by a plural digit number and being controlled by a multiplier setting means, said apparatus comprising a multiplicand pulse counter, a plural-stage product pulse counter, means to extract from said multiplicand counter a signal upon attainment thereby of a count representative of a selected magnitude of said variable quantity, switch means connectible into a plurality of stages of said product pulse counter to extract from each of said stages a signal upon attainment by such stage of the count corresponding, for a selected value of said multiplier, to the product pertaining to said selected magnitude of said variable quantity, gate means receiving each of said signals on a separate input, said gate means providing an output only upon coincidence of signals at each of said inputs, and means to limit the time duration of at least one of said signals as applied to said gate means.

6. Apparatus according to claim 5 wherein said gate means comprises a single coincidence circuit.

7. Apparatus for checking the correctness of a multiplication device for the multiplication together of a variable multiplier and a variable multiplicand, wherein multiplicand pulses are generated representative of increments of a variable quantity and product pulses are generated at a rate relative to the rate of generation of said multiplicand pulses representative of a selected value of said multiplier, said rate of generation of product pulses being controlled by a multiplier setting means, said apparatus comprising a multiplicand pulse counter, a product pulse counter, switch means settable to extract from said product pulse counter a signal upon attainment of a product pulse count equal, for a selected rate of generation of multiplier pulses, to the product of said rate and a selected magnitude of said variable quantity, means to extract from said multiplicand counter a signal upon attainment thereby of a count representative of said selected magnitude of said variable quantity, a coincidence gate circuit having at least two inputs and one output, and means to apply said signals to separate ones of said inputs, at least one of said last-named means limiting the time duration of signals passed therethrough.

8. Apparatus for checking the correctness of a multiplication device for the multiplication together of a multiplier and a time-varying multiplicand, wherein electrical multiplicand pulses are generated representative of increments of a varying quantity and electrical product pulses are generated at a rate proportional, according to the value of the multiplier, to the rate of generation of said multiplicand pulses, said apparatus comprising a multiplicand pulse counter for receipt of said multiplicand pulses, a product pulse counter for receipt of said product pulses, means to extract a signal from said multiplicand counter upon attainment of a selected count therein, means to extract a signal from said product counter upon attainment of a selected count therein, a coincidence gate having at least two inputs and one output, and separate means to apply said signals to separate ones of said inputs, at least one of said last-named means passing a signal applied thereto for a limited time only.

9. Apparatus for checking the correctness of a multiplication device for the multiplication together of a multiplier and a time-varying multiplicand, wherein electrical multiplicand pulses are generated representative of increments of a varying quantity and electrical product pulses are generated at a rate proportional, according to the value of the multiplier, to the rate of generation of said multiplicand pulses, said apparatus comprising plural stage multiplicand and product pulse counters for receipt of said multiplicand and product pulses respectively, separate means to extract signals from said counters upon the attainment of specified counts therein respectively, at least one of said extracting means serving to extract separate signals from plural stages of one of said counters, coincidence gate means having as many inputs as signals are extracted by said separate extraction means together, and means to apply said extracted signals separately to said inputs, at least one of said last-named means passing to its said input a signal applied thereto for a limited time only.

10. Apparatus for checking the correctness of a multiplication device for the multiplication together of a multiplier and a time-varying multiplicand, wherein electrical multiplicand pulses are generated representative of increments of a varying quantity and electrical product pulses are generated at a rate proportional, according to the value of the multiplier, to the rate of generation of said multiplicand pulses, said apparatus comprising plural stage multiplicand and product pulse counters for receipt of said multiplicand and product pulses respectively, separate means to extract signals from said counters upon the attainment of specified counts therein respectively, at least one of said extracting means serving to extract separate signals from plural stages of one of said counters, a coincidence gate having as many inputs as signals are extracted by said separate extraction means together, a diode in each of said inputs, and means to limit the time duration of signals applied to at least one of said inputs.

References Cited by the Examiner
UNITED STATES PATENTS

| | | | |
|---|---|---|---|
| 2,068,719 | 1/1937 | Troutman | 235—92 |
| 3,036,290 | 5/1962 | Zarouni | 235—153 |

ROBERT C. BAILEY, *Primary Examiner.*

MALCOLM A. MORRISON, *Examiner.*